United States Patent [19]

Sekhar et al.

[11] Patent Number: 5,611,953
[45] Date of Patent: Mar. 18, 1997

[54] SINTER-HOMOGENIZED HEATING PRODUCTS

[75] Inventors: Jainagesh A. Sekhar, Cincinnati; Naiping Zhu, Cleveland, both of Ohio

[73] Assignee: Micropyretics Heaters International, Inc., Cincinnati, Ohio

[21] Appl. No.: 441,606

[22] Filed: May 15, 1995

Related U.S. Application Data

[63] Continuation-in-part of Ser. No. 242,362, May 13, 1994, abandoned.

[51] Int. Cl.$^6$ .................................... H05B 3/10
[52] U.S. Cl. .................... 219/553; 252/515; 252/516; 252/520; 501/96
[58] Field of Search .................... 219/270, 552–553; 501/96; 252/515–516, 520; 29/611

[56] References Cited

U.S. PATENT DOCUMENTS

| | | |
|---|---|---|
| 3,090,094 | 5/1963 | Schwartzwalder . |
| 3,097,930 | 7/1963 | Holland . |
| 3,111,396 | 11/1963 | Ball . |
| 3,314,876 | 4/1967 | Ransley . |
| 3,330,756 | 7/1967 | Ransley . |
| 3,608,599 | 9/1971 | Spear . |
| 3,617,358 | 11/1971 | Dittrich . |
| 3,705,791 | 12/1972 | Bredzs . |
| 3,726,643 | 4/1973 | Merzhanov et al. . |
| 3,872,419 | 3/1975 | Groves et al. . |
| 3,969,696 | 7/1976 | Wolfe et al. . |
| 4,003,014 | 1/1977 | Branson et al. . |
| 4,193,106 | 3/1980 | Coleman . |
| 4,202,691 | 5/1980 | Yurasko . |
| 4,217,948 | 8/1980 | Merzhanov et al. . |
| 4,267,435 | 5/1981 | Best . |
| 4,459,363 | 7/1984 | Holt . |
| 4,610,726 | 9/1986 | King . |
| 4,655,830 | 4/1987 | Akashi et al. . |
| 4,710,348 | 12/1987 | Brupbacher et al. . |
| 4,738,389 | 4/1988 | Moshier et al. . |
| 4,747,873 | 5/1988 | Kamloka . |
| 4,751,048 | 6/1988 | Christodoulou et al. . |
| 4,772,452 | 9/1988 | Brupbacher et al. . |
| 4,774,052 | 9/1988 | Nagle et al. . |
| 4,800,065 | 1/1989 | Christodoulou et al. . |
| 4,808,372 | 2/1989 | Koczak et al. . |
| 4,836,982 | 1/1989 | Brupbacher et al. . |
| 4,877,759 | 10/1989 | Holt et al. . |
| 4,894,273 | 1/1990 | Lieberman et al. .................... 252/515 |
| 4,902,457 | 2/1990 | Wada et al. . |
| 4,904,424 | 2/1990 | Johnson . |
| 4,909,842 | 3/1990 | Dunmead et al. . |
| 4,915,903 | 4/1990 | Brupbacher et al. . |
| 4,915,905 | 4/1990 | Kampe et al. . |
| 4,948,761 | 8/1990 | Hida . |
| 4,957,885 | 9/1990 | Hida . |
| 4,965,044 | 10/1990 | Miyamoto et al. . |
| 4,975,412 | 12/1990 | Okazaki et al. . |
| 4,985,202 | 1/1991 | Moshier et al. . |
| 4,988,480 | 1/1991 | Meerzhanov et al. . |
| 4,988,645 | 1/1991 | Holt et al. . |
| 4,990,295 | 2/1991 | Hida . |
| 4,999,049 | 3/1991 | Balderson et al. ....................... 219/553 |
| 4,999,137 | 3/1991 | Wapler et al. ........................... 252/516 |
| 4,999,144 | 3/1991 | Miyamoto et al. . |
| 5,006,290 | 4/1991 | Hida . |
| 5,011,800 | 4/1991 | Abramovici et al. . |
| 5,019,454 | 5/1991 | Busse . |
| 5,022,991 | 6/1991 | Day et al. . |
| 5,030,600 | 7/1991 | Hida et al. . |
| 5,032,332 | 7/1991 | Hida et al. . |
| 5,063,121 | 11/1991 | Sato et al. ................................ 252/515 |
| 5,071,797 | 12/1991 | Hida . |
| 5,086,210 | 2/1992 | Nunogaki et al. ....................... 219/270 |
| 5,110,688 | 5/1992 | Sekhar et al. . |
| 5,143,668 | 9/1992 | Hida . |
| 5,145,619 | 9/1992 | Abramovici . |
| 5,149,677 | 9/1992 | Merzhanov et al. . |
| 5,169,572 | 12/1992 | Matthews . |
| 5,188,678 | 2/1993 | Sekhar et al. . |
| 5,198,188 | 3/1993 | Holt et al. . |
| 5,213,730 | 5/1993 | Hida . |
| 5,217,583 | 6/1993 | Sekhar et al. . |
| 5,221,647 | 6/1993 | Hida et al. . |
| 5,279,737 | 1/1994 | Sekhar et al. . |
| 5,316,718 | 5/1994 | Sekhar . |
| 5,320,717 | 6/1994 | Sekhar . |
| 5,340,014 | 8/1994 | Sekhar et al. . |
| 5,340,448 | 8/1994 | Sekhar et al. . |
| 5,342,491 | 8/1994 | Sekhar . |
| 5,376,421 | 12/1994 | Sekhar et al. . |
| 5,382,405 | 1/1995 | Lowrance, II et al. . |
| 5,420,399 | 5/1995 | Sekhar et al. . |
| 5,425,496 | 6/1995 | Zhu et al. . |

FOREIGN PATENT DOCUMENTS

| | | |
|---|---|---|
| 0164830 | 12/1985 | European Pat. Off. . |
| 0258510 | 9/1986 | European Pat. Off. . |
| 0404943 | 9/1991 | European Pat. Off. . |
| 1096063 | 4/1989 | Japan . |
| 584052 | 12/1977 | U.S.S.R. . |
| 9003956 | 4/1990 | WIPO . |
| 9013513 | 11/1990 | WIPO . |

*Primary Examiner*—Teresa J. Walberg
*Assistant Examiner*—Raphael Valencia
*Attorney, Agent, or Firm*—Dinsmore & Shohl

[57] ABSTRACT

Electrical heating elements operable at high temperatures for long periods are produced by a method involving micropyretic synthesis. Compositions subjected to micropyretic synthesis comprises a powdery mass of electrically conductive and semiconductive material, a reactive system, a grain growth inhibitor and a plasticizer or extrusion agent.

21 Claims, No Drawings

SINTER-HOMOGENIZED HEATING PRODUCTS

This application is a continuation-in-part of application Ser. No. 8/242,362 filed May 13, 1994 now abandoned.

FIELD OF INVENTION

This invention relates to composite silicide or carbide heating element compositions which include improved combustion sources and refractory silicides such as tungsten silicide. This invention will enable combustion synthesized composite heating elements which include the combustion sources disclosed herein to be used at temperatures up to 900° C. for long periods of time in oxidizing atmospheres.

BACKGROUND OF THE INVENTION

This invention has been conceived to create heating elements which can work at high temperatures for long periods. Accordingly, this invention discloses new micropyretic sources and their combinations which allow for the first time, manufacture of heating elements displaying extended life at very high temperatures. A micropyretic synthesis method is used for the manufacture of heating elements, similar to that disclosed in our co-pending U.S. patent application Ser. No. 08/027,710, filed Mar. 8, 1993 (herein after referred to as "the '710 application", the contents of which are incorporated herein by way of reference). The synthesis method used in this invention differs from that disclosed in co-pending U.S. patent application Ser. No. 07/847,782, filed Mar. 5, 1992 (hereinafter referred to as "the '782 application", the contents of which are incorporated herein purely by way of reference), in an important aspect. As in the '782 application, a combustible slurry is prepared, extruded and combusted. However, unlike the '782 application, after combustion, these wire or other shapes are densified and homogenized by passing current, as described in the '710 application.

The '782 application discloses various combustion sources as part of the compositions, for the manufacture of heating elements. $MoSi_2$ composites are preferred in the '782 application. $MoSi_2$ composites are very sensitive to phase composition and impurity at temperatures above 1600° C. The present compositions comprise new undisclosed combustion sources, grain growth inhibitors and other additives which substantially improve the applicability of heating elements manufactured using these compositions at temperatures up to 1900° C. Additionally, some of the combustion sources and their products described in the '782 application may react with filler materials, and therefore may not be suitable as combustion sources for high temperature applications although they may be excellent for low and middle temperature applications (up to 1400° C.). The compositions of the present invention are designed so that the combustibles do not react with the silicides, which is believed to be one of reasons leading to the effective utilization of heating elements manufactured using the compositions of the present invention for extended periods at high temperatures. By utilizing combustibles which may react with the filler materials, the '782 application teaches away from the present invention.

The high temperature superiority of heating elements manufactured using the compositions of the present invention, over the compositions of the '782 application, has been observed by experimentation. These experiments have revealed that heating elements using the compositions of the present invention are stable at temperatures above 1400° C., for much longer periods than those manufactured using the compositions of the '782 application. Without exception, a difference in time periods of at least two orders of magnitude has been observed. At temperatures above 1400° C. to 1600° C., after operation for 10–100 hours, heating elements using the '782 compositions deteriorate substantially. Conversely, typical heating elements using the compositions of the present invention show similar deterioration at 1400° C. to 1600° C., only after 5000 hours. Additionally, above 1600° C., heating elements using the '782 compositions last for less than 1 hour, whereas typical heating elements using the compositions of the present invention last for greater than 1000 hours. This tremendous increase in high temperature operability, is very beneficial and also quite unexpected.

SUMMARY OF THE INVENTION

It is a primary object of the present invention to provide new combustion sources and compositions for manufacturing heating elements which are stable up to 1900° C.

It is a further object of the present invention to provide new combustion sources which will enhance the working temperature and life of heating elements and improve the oxidation resistance of heating elements at high temperatures.

It is another object of the present invention to provide new combustion sources which will prevent any possible reaction between the combustion sources, the combustion products, the silicides and the plasticizers.

It is yet another object of this invention to provide combustion synthesis product(s) with increased creep resistance and strength, by forming in situ compounds between carbides such as tungsten carbide and metalloids such as carbon or silicon. Such compounds are finely and homogeneously distributed in matrix of a major silicide phase e.g. in $MoSi_2$ or $WSi_2$. In addition, these finely distributed particles will also act as grain growth inhibitors and also influence the recrystallization behavior.

In accordance with the present invention, there is provided a pliable composition comprising by weight percent: (a) between about 10 and 90% of a powdery mass of electrically conductive and/or semiconductive material selected from the group consisting of $WSi_2$, $MoSi_2$ and mixtures thereof; (b) between about 5% and 50% of a combustible source which is selected from the group consisting of $WO_3+Al+Si$, $MoO_3+Zr+Si$, $WO_3+Zr+Si$, $WC+Si$, $Mo_2C+Si$ and mixtures thereof; (c) between about 0.5 to 10% of grain growth inhibitors selected from the group consisting of $TiB_2$, $HfB_2$, SiC and mixtures thereof; (d) at least about 1 weight percent bentonite; and (e) at least about 3 ml per 30 g of the above listed components, of colloidal silica solution.

In accordance with another aspect of the present invention there is provided a method of manufacturing a composite article using the composition described above, comprising the steps of: (a) premixing the powders comprising the combustible source in the composition; (b) blending said premixture with the other components of the composition; (c) forming a pliable slurry from said blend; (d) fashioning said slurry into a final desired article shape; (e) combusting said shape by ignition at a temperature between about 100° C. and 1600° C.; (f) initially applying sufficient current to said article so as to raise the temperature of said article to a minimum of 50% of the melting point in degrees Kelvin, of the lowest melting phase in the article, wherein the current applied is selected from the group consisting of a DC current, an AC current, a pulsed current and an induction current; and (g) greatly reducing the porosity of said article so as to make the repetitive distance between consecutive homogenous sections of said article to less than 0.002 m, by increasing said current applied so as to cause the elimination of thermal and mass gradients.

In accordance with a further aspect of the present invention, there is provided a pliable composition comprising by weight percent: (a) between about 60 and 85% of a powdery mass of electrically conductive and/or semiconductive material selected from the group consisting of $WSi_2$, $MoSi_2$ and mixtures thereof; (b) about 15% of $WO_3+Al+Si$ as a combustible source; (c) about 2% of $HfB_2$ as a grain growth inhibitor; (d) about 1 weight percent bentonite; (e) about 3 ml per 30 g of the above listed components, of colloidal silica solution; and (f) about 0.5 weight percent C.

DETAILED DESCRIPTION OF THE PREFERRED EMBODIMENT

Examples of specific compositions which have been found to provide heating elements having longer working life up to 1900° C., are disclosed as follows:

(all compositions herein are by weight percent of the total composition, unless otherwise indicated)

| Composition 1 | |
| --- | --- |
| $WSi_2$ | 10 |
| $MoSi_2$ | 71.5 |
| $WO_3 + 2Al + 2Si_2$ | 15 |
| $HfB_2$ | 2 |
| C (present in the form of graphite in all compositions herein) | 0.5 |
| Bentonite | 1 |
| Colloidal Silica (type 830 Nycol corporation) | 3 ml/30 g powder (this implies 3 ml per 30 g of the remaining components) |
| Composition 2 | |
| $WSi_2$ | 20 |
| $MoSi_2$ | 61.5 |
| $WO_3 + 2Al + 2Si_2$ | 15 |
| $HfB_2$ | 2 |
| C | 0.5 |
| Bentonite | 1 |
| Colloidal Silica | 3 ml/30 g powder |
| Composition 3 | |
| $WSi_2$ | 30 |
| $MoSi_2$ | 51.5 |
| $WO_3 + 2Al + 2Si_2$ | 15 |
| $HfB_2$ | 2 |
| C | 0.5 |
| Bentonite | 1 |
| Colloidal Silica | 3 ml/30 g powder |
| Composition 4 | |
| $WSi_2$ | 40 |
| $MoSi_2$ | 41.5 |
| $WO_3 + 2Al + 2Si_2$ | 15 |
| $HfB_2$ | 2 |
| C | 0.5 |
| Bentonite | 1 |
| Colloidal Silica | 3 ml/30 g powder |
| Composition 5 | |
| $WSi_2$ | 50 |
| $MoSi_2$ | 31.5 |
| $WO_3 + 2Al + 2Si_2$ | 15 |
| $HfB_2$ | 2 |
| C | 0.5 |
| Bentonite | 1 |
| Colloidal Silica | 3 ml/30 g powder |
| Composition 6 | |
| $WSi_2$ | 20 |
| $MoSi_2$ | 61.5 |
| $WO_3 + 2Al + 2Si_2$ | 7 |
| $2WO_3 + 3Zr + 4Si$ | 8 |
| $HfB_2$ | 2 |
| C | 0.5 |
| Bentonite | 1 |
| Colloidal Silica | 3 ml/30 g powder |
| Composition 7 | |
| $WSi_2$ | 20 |
| $MoSi_2$ | 57 |
| $WO_3 + 2Al + 2Si_2$ | 5 |
| $WC + 3Si$ | 15 |
| $TiB_2$ | 2 |
| Bentonite | 1 |
| Colloidal Silica | 5 ml/30 g powder |
| Composition 8 | |
| $WSi_2$ | 20 |
| $MoSi_2$ | 54 |
| $WO_3 + 2Al + 2Si_2$ | 8 |
| $WC + 3Si$ | 15 |
| $TiB_2$ | 2 |
| Bentonite | 1 |
| Colloidal Silica | 5 ml/30 g powder |
| Composition 9 | |
| $WSi_2$ | 20 |
| $MoSi_2$ | 52 |
| $WO_3 + 2Al + 2Si_2$ | 10 |
| $WC + 3Si$ | 15 |
| $TiB_2$ | 2 |
| Bentonite | 1 |
| Colloidal Silica | 5 ml/30 g powder |
| Composition 10 | |
| $WSi_2$ | 20 |
| $MoSi_2$ | 47 |
| $WC + 3Si$ | 15 |
| $WO_3 + 2Al + 2Si_2$ | 15 |
| $TiB_2$ | 2 |
| Bentonite | 1 |
| Water with organic binders | 5 ml/30 g powder. |

(organic binders may be methyl cellulose, polyethylene glycol with an average molecular weight. of 200, polyethylene glycol with an average molecular weight of 300, glycerol, 99.5%, polyvinyl butyral, dioctyl adipate and their combinations)

| Composition 11 | |
| --- | --- |
| $WSi_2$ | 20 |
| $MoSi_2$ | 57 |
| $MO_2C + 5Si$ | 15 |
| $WO_3 + 2Al + 2Si_2$ | 5 |
| $TiB_2$ | 2 |
| Bentonite | 1 |
| Colloidal Silica | (5 ml/30 g powder) |
| Composition 12 | |
| $WSi_2$ | 20 |
| $MoSi_2$ | 54 |
| $MO_2C + 5Si$ | 15 |
| $MoO_3 + 2Al + 2Si$ | 8 |
| $TiB_2$ | 2 |
| Bentonite | 1 |
| Colloidal Silica | 5 ml/30 g powder |
| Composition 13 | |
| $WSi_2$ | 20 |
| $MoSi_2$ | 57 |
| $Mo_2C + 5Si$ | 15 |
| $WO_3 + 2Al + 2Si_2$ | 5 |
| $HfB_2$ | 2 |

(all compositions herein are by weight percent of the total composition, unless otherwise indicated)

| | |
|---|---|
| Bentonite | 1 |
| Colloidal Silica | 5 ml/30 g powder |
| Composition 14 | |
| $WSi_2$ | 20 |
| $MoSi_2$ | 47 |
| $WC + 3Si$ | 25 |
| $WO_3 + 2Al + 2Si_2$ | 5 |
| $TiB_2$ | 2 |
| Bentonite | 1 |
| Colloidal Silica | 5 ml/30 g powder |
| Composition 15 | |
| $WSi_2$ | 20 |
| $MoSi_2$ | 47 |
| $Mo_2C + 5Si$ | 25 |
| $WO_3 + 2Al + 2Si$ | 5 |
| $TiB_2$ | 2 |
| Bentonite | 1 |
| Colloidal Silica | 5 ml/30 g powder |
| Composition 16 | |
| $WSi_2$ | 20 |
| $MoSi_2$ | 47 |
| $Mo_2C + 5Si$ | 25 |
| $WO_3 + 2Al + 2Si_2$ | 5 |
| $TiB_2$ | 2 |
| Bentonite | 1 |
| Colloidal Silica | 5 ml/30 g powder |
| Composition 17 | |
| $MoSi_2$ | 87 |
| $2WO_3 + 3Zr + 4Si$ | 10 |
| $TiB_2$ | 2 |
| Bentonite | 1 |
| Colloidal Silica | 5 ml/30 g |
| Composition 18 | |
| $MoSi_2$ | 82 |
| $2WO_3 + 3Zr + 4Si$ | 5 |
| $WO_3 + 2Al + 2Si$ | 10 |
| $TiB_2$ | 2 |
| Bentonite | 1 |
| Colloidal Silica | 5 ml/30 g |
| Composition 19 | |
| $MoSi_2$ | 77 |
| $2WO_3 + 3Zr + 4Si$ | 10 |
| $WO_3 + 2Al + 2Si$ | 10 |
| $TiB_2$ | 2 |
| Bentonite | 1 |
| Colloidal Silica | 5 ml/30 g |
| Composition 20 | |
| $WSi_2$ | 20 |
| $MoSi_2$ | 62 |
| $2WO_3 + 3Zr + 4Si$ | 5 |
| $WC + 3Si$ | 10 |
| $TiB_2$ | 2 |
| Bentonite | 1 |
| Colloidal Silica | 5 ml/30 g |
| Composition 21 | |
| $MoSi_2$ | 87 |
| $2WO_3 + 3Zr + 4Si$ | 10 |
| $Si_3N_4$ | 2 |
| Bentonite | 1 |
| Colloidal Silica | 5 ml/30 g |
| Composition 22 | |
| $MoSi_2$ | 82 |
| $2WO_3 + 3Zr + 4Si$ | 15 |
| $SiC$ | 2 |
| Bentonite | 1 |
| Colloidal Silica | 5 ml/30 g |
| Composition 23 | |
| $MoSi_2$ | 77 |
| $2WO_3 + 3Zr + 4Si$ | 20 |
| $TiB_2$ | 2 |
| Bentonite | 1 |
| Colloidal Silica | 5 ml/30 g |
| Composition 24 | |
| $MoSi_2$ | 77 |
| $2WO_3 + 3Zr + 4Si$ | 10 |
| $2MO_3 + 3Zr + 4Si$ | 10 |
| $TiB_2$ | 2 |
| Bentonite | 1 |
| Colloidal Silica | 5 ml/30 g |
| Composition 25 | |
| $WSi_2$ | 10 |
| $MoSi_2$ | 72 |
| $2MoO_3 + 3Zr + 4Si$ | 10 |
| $WC + 3Si$ | 5 |
| $TiB_2$ | 2 |
| Bentonite | 1 |
| Colloidal Silica | 5 ml/30 g |

Broadly stated, the compositions of the present invention comprise between about 10 and 90% of a powdery mass of electrically conductive and/or semiconductive material selected from the group consisting of $WSi_2$, $MoSi_2$ and mixtures thereof; between about 5% and 50% of a combustible source which is selected from the group consisting of $WO_3$+Al+Si, $MoO_3$+Zr+Si, $WO_3$+Zr+Si, WC+Si, $Mo_2C$+Si and mixtures thereof; between about 0.5 to 10% of grain growth inhibitors selected from the group consisting of $TiB_2$, $HfB_2$, SiC and mixtures thereof; at least about 1 weight percent bentonite; and at least about 3 ml/30 g of colloidal silica solution.

The combustion sources have to be premixed before mixing with other powders, in order to produce sufficient heat during combustion. The weight percentage of combustibles in the compositions of the present invention will not be less than 5 wt %, but will not be more than 90%. A combustible content of more than 50% will lead to too strong combustion, and therefore, to samples (heating elements) with large pores and deformed shapes. Compositions with combustibles less then 5% will not be able to produce enough heat to sinter the wire and therefore the wire may not be conductive enough to be finally sintered, densified and homogenized by passing current. The addition of $WSi_2$ or $MoSi_2$ increases the working temperature, life of heating elements at high temperature and creep resistance, but $WSi_2$ or $MoSi_2$ content of more than 90 weight percent will drastically decrease thermal shock resistance and oxidation resistance of heating element.

The preferred compositions of the present invention comprise from about 10 to 30 percent $WSi_2$, up to 4% SiC, up to 3% $TiB_2$, up to 3% $HfB_2$ (said SiC, $TiB_2$ and $HfB_2$ being at least 0.5 percent), close to 2% bentonite and close to 15 ml/100 g of powder of colloidal silica. The most preferred composition for manufacturing high temperature heating elements is as follows: 15–30 percent of $WSi_2$, 15–20 percent combustibles, 1–2 percent $TiB_2$ and $HfB_2$ and 0.5–1 percent C. Heating elements made from compositions 1, 2 and 3 above, lasted for over 1000 hours at temperatures from 1700° to 1750° C.

Yet another preferred and unique composition discloses the use of a combination of WC+Si or $Mo_2C$+Si with $WO_3$+Al+Si or $WO_3$+Zr+Si. The content of carbide combustion source (WC+Si or Mo₂C+Si) will be from 1 to 50%; oxide combustion source (WO₃+Al+Si or WO₃+Zr+Si) will be 5–30%. The total weight percent of the combustion source is at least 5%. In its more preferred aspects, the carbide combustion source ranges from 15 to 20%, oxide combustion source will be 5–10 wt %. By using carbide combustion sources, alumina content in the final products will be tremendously reduced. It was found that heating elements manufactured using a combination of carbide and oxide combustion sources (for instance, composition 9), show excellent temperature capacity and improved life up to 1850° C.

Yet another preferred and unique composition discloses WO₃+Zr+Si and MOO₃+Zr+Si as combustion sources or combinations thereof. These compositions show strong and stable combustion when mixed with MoSi₂ and WSi₂ powders. The final products of these combustion sources are WSi₂ (or MoSi₂) and ZrO₂. Part of ZrO₂ will react further with SiO₂ during sintering to form zircon which has high melting point and phase stability with MoSi₂ and WSi₂. The total weight percent of the combustion source in these compositions is at least 5%. In its more preferred aspects, the WO3+Zr+Si combustion source will be from 10 to 25 weight percent. It was found that the compositions using this combustion source show excellent sintering properties and high temperature capability up to 1850° C.

Optimal (these are merely preferred particle sizes) particle sizes are disclosed for various the components listed above as follows:

| | |
|---|---|
| SiC | 1 μm |
| WSi₂ | 4 μm |
| Zr | 3.5–4 μm |
| MoSi₂ | 4 μm |
| C | 300 mesh (15 μm) |
| WO₃ | 8 μm |
| Mo₂C | 325 mesh (44 μm) |
| Al | 325 mesh (44 μm) |
| Si | 325 mesh (44 μm) |
| HfB₂ | 325 mesh (44 μm) |
| WC | 1 μm |
| TiB₂ | 1 μm |
| MoO₃ | 8 μm |
| Si₃N₄ | 325 mesh (44 μm) |
| Bentonite | 5 μm |
| Colloidal silica | nanosize colloid |

Thus it is apparent that there have been provided, in accordance with the invention, compositions suited for preparing heating elements which may be operated at temperatures up to 1900° C. or for very long durations at lower temperatures such as 1750° C., which fully satisfy the objects, aspects and advantages set forth above. While the invention has been described in conjunction with specific embodiments thereof, it is evident that many alternatives, modifications, and variations will be apparent to those skilled in the art in light of the foregoing description. For example, it is contemplated that in addition to the combustion sources described and claimed herein, a particular composition may comprise other combustion sources. Accordingly, it is intended to embrace all such alternatives, modifications and variations which fall within the spirit and scope of the appended claims.

We claim:

1. A pliable composition comprising by weight percent:
   (a) between about 10 and 90% of a powdery mass of material which is electrically conductive, semiconductive or electrically conductive and semiconductive, selected from the group consisting of WSi₂, MoSi₂ and mixtures thereof;
   (b) between about 5 % and 50% of a combustible source which is selected from the group consisting of WO₃, Al and Si, MoO₃, Zr and Si, WO₃, Zr and Si, WC, and Si, MoC₂ and Si and mixtures thereof;
   (c) between about 0.5 to 10% of grain growth inhibitors selected from the group consisting of TiB₂, HfB₂, SiC and mixtures thereof;
   (d) at least about 1 weight percent bentonite; and
   (e) at least about 3 ml per 30 g of (a) through (d), of colloidal silica solution.

2. An electrical heating element capable of being used at temperatures up to 1900° C. formed by micropyretic synthesis of the composition of claim 1.

3. An integral article having improved mechanical stability, room temperature fracture toughness, and oxidation resistance at temperatures up to 1900° C., and stable electrical conductivity, comprising an integral article formed by micropyretic synthesis of the composition of claim 1.

4. A integral article formed by micropyretic synthesis of the composition of claim 1 for use as a gas ignitor.

5. An electrical heating element capable of being used at temperatures up to 1900° C. formed by micropyretic synthesis of the composition of claim 1, said heating element comprising WSi₂, MoSi or a mixture thereof.

6. The composition of claim 1 further comprising up to 20 weight percent bentonite.

7. An electrical heating element suitable for use as a high temperature indicator comprising an integral article formed by micropyretic synthesis of the composition of claim 6.

8. The composition of claim 1 comprising about 10 to 30 weight percent WSi₂, from about 0.5 weight percent to 4 weight percent SiC, from about 0.5 weight percent to 3 weight percent TiB₂, from about 0.5 weight percent to 3 weight percent HfB₂, up to 2 weight percent bentonite and up to 15 ml per 30 g of (a) through (d), of colloidal silica.

9. An electrical heating element capable of being used at temperatures up to 1900° C. comprising an integral article formed by micropyretic synthesis of the composition of claim 8.

10. The composition of claim 8 comprising 15–30 weight percent of W/Si₂, 15–20 weight percent combustibles, 1–2 weight percent TiB₂ and HfB₂ and further comprising 0.5–1 weight percent C.

11. An electrical heating element capable of being used at temperatures up to 1900° C. comprising an integral article formed by micropyretic synthesis of the composition of claim 10.

12. The composition of claim 1 further comprising up to 1 weight percent carbon; up to 2 weight percent bentonite; and up to 15 ml per 30 g of (a) through (d), of colloidal silica.

13. An electrical heating element capable of being used at temperatures up to 1900° C. comprising an integral article formed by micropyretic synthesis of the composition of claim 12.

14. The composition of claim 12, wherein said combustible source is selected from the group consisting of MoO₃, Zr and Si, WO₃, Zr and Si and mixtures thereof.

15. An electrical heating element capable of being used at temperatures up to 1900° C. comprising an integral article formed by micropyretic synthesis of the composition of claim 14.

16. The composition of claim 14 wherein said combustible source is between about 10 to 25 weight percent WO₃, Zr and Si.

17. An electrical heating element capable of being used at temperatures up to 1900° C. comprising an integral article formed by micropyretic synthesis of the composition of claim 16.

18. A method for the preparation of integral articles having improved mechanical stability, room temperature fracture toughness, and oxidation resistance at temperatures up to 1900° C., and stable electrical conductivity, comprising the steps of:

(a) premixing the powders comprising the combustible source in the composition of claim 1;

(b) blending the powders with the other components of the composition of claim 1;

(c) forming a pliable slurry from the powders and the other components;

(d) fashioning said slurry into a final desired article shape;

(e) combusting said shape by ignition at a temperature between about 100° C. and 1600° C.;

(f) initially applying sufficient current to said article so as to raise the temperature of said article to a minimum of 50% of the melting point in degrees Kelvin, of the lowest melting phase in the article, wherein the current applied is selected from the group consisting of a DC current, an AC current, a pulsed current and an induction current; and (g) greatly reducing the porosity of said article so as to make the repetitive distance between consecutive homogenous sections of said article to less than 0.002 m, by increasing said current applied so as to cause the elimination of thermal and mass gradients.

19. An integral article having improved mechanical stability, room temperature fracture toughness, and oxidation resistance at temperatures up to 1900° C., and stable electrical conductivity, produced in accordance with the process of claim 18.

20. A pliable composition comprising by weight percent:

(a) between about 60 and 85 % of a powdery mass of material which is electrically conductive, semiconductive or electrically conductive and semiconductive, selected from the group consisting of $WSi_2$, $MoSi_2$ and mixtures thereof;

(b) about 15% of $WO_3$, Al and Si as a combustible source;

(c) about 2 % of $HfB_2$ as a grain growth inhibitor;

(d) about 1 weight percent bentonite;

(e) about ml per 30 g of (a) through (d), of colloidal silica solution; and (f) about 0.5 weight percent C.

21. An electrical heating element capable of being used at temperatures up to 1900° C. comprising an integral article formed by micropyretic synthesis of the composition of claim 20.

* * * * *